(12) United States Patent
Duquenoy et al.

(10) Patent No.: US 12,455,285 B2
(45) Date of Patent: Oct. 28, 2025

(54) METHOD FOR DETECTING BACTERIA ACCORDING TO THE GRAM SIGNAL THEREOF IN A COMPLEX SAMPLE

(71) Applicants: MaaT PHARMA, Lyons (FR); BIOASTER, Lyons (FR)

(72) Inventors: Aurore Duquenoy, Lyons (FR); Samuel Bellais, Lyons (FR); Vincent Thomas, Lyons (FR)

(73) Assignees: MaaT PHARMA, Lyons (FR); BIOASTER, Lyons (FR)

( * ) Notice: Subject to any disclaimer, the term of this patent is extended or adjusted under 35 U.S.C. 154(b) by 1258 days.

(21) Appl. No.: 17/253,613

(22) PCT Filed: Jun. 13, 2019

(86) PCT No.: PCT/FR2019/051435
§ 371 (c)(1),
(2) Date: Dec. 17, 2020

(87) PCT Pub. No.: WO2019/243714
PCT Pub. Date: Dec. 26, 2019

(65) Prior Publication Data
US 2021/0172948 A1   Jun. 10, 2021

(30) Foreign Application Priority Data

Jun. 18, 2018   (FR) ...................................... 1855350

(51) Int. Cl.
*G01N 33/569* (2006.01)
*C12Q 1/04* (2006.01)

(52) U.S. Cl.
CPC ......... *G01N 33/56911* (2013.01); *C12Q 1/04* (2013.01); *G01N 2333/4724* (2013.01)

(58) Field of Classification Search
None
See application file for complete search history.

(56) References Cited

U.S. PATENT DOCUMENTS

2015/0064703 A1* 3/2015 Super ............... G01N 33/56938
435/6.12

OTHER PUBLICATIONS

Yang et al., Dual Fluorescent and Isotopic-Labeled Self-Assembling Vancomycin for in vivo imaging of bacterial infections, Agnew. Chem. Int. Ed. 2017, 56, published Jan. 26, 2017. (Year: 2017).*

Langerhuus, S.N., et al., Gram-typing of mastitis bacteria in milk samples using flow cytometry, Journal of Dairy Science, vol. 96, Issue 1, Jan. 1, 2013, 12 pages.

(Continued)

*Primary Examiner* — Rebecca M Giere
(74) *Attorney, Agent, or Firm* — ArentFox Schiff LLP (57) ABSTRACT

The invention relates to a method for detecting the proportion of Gram-positive and Gram-negative bacteria in a complex sample. The bacteria are detected according to the Gram signal thereof. The invention enables distinction between species of Gram-positive bacteria and species of Gram-negative bacteria in a complex sample. The invention also relates to a kit for marking Gram-positive and Gram-negative bacteria, particularly for use in flow cytometry, particularly for complex samples such as human or animal microbiota samples.

17 Claims, 4 Drawing Sheets

(56) References Cited

OTHER PUBLICATIONS

International Search Report for PCT/FR2019/051435, dated Aug. 2, 2019, 3 pages.
Mason, David J., et al., A Fluorescent Gram Stain for Flow Cytometry and Epifluorescence Microscopy, Applied and Environmental Microbiology, Jul. 1998, vol. 64, No. 7, 6 pages.
Schuch, R., et al., Combination Therapy With Lysin CF-301 and Antibiotic Is Superior to Antibiotic Alone for Treating Methicillin-Resistant *Staphylococcus aureus*-Induced Murine Bacteremia, The Journal of Infectious Diseases, vol. 209, Issue 9, May 1, 2014, 10 pages.
Yagüe, Paula, et al., Subcompartmentalization by cross-membranes during early growth of *Streptomyces hyphae*, Nature Communications, vol. 7, 2016, 12 pages.
Duquenoy, Aurore, et al., Gram proportion determination in complex ecosystems using flow cytometry, MaaT Pharma, 2018, 2 pages.

\* cited by examiner

METHOD FOR DETECTING BACTERIA ACCORDING TO THE GRAM SIGNAL THEREOF IN A COMPLEX SAMPLE

CROSS-REFERENCE TO RELATED APPLICATIONS

This application is a National Stage of PCT/FR2019/051435, filed on Jun. 13, 2019, which claims priority to French Patent Application No. 1855350, filed on Jun. 18, 2018, the disclosures of which are hereby incorporated by reference in their entireties.

The present application relates to a method for detecting the proportion of Gram-positive bacteria and the proportion of Gram-negative bacteria in a sample, in particular in a complex sample. The bacteria are detected according to the Gram signal thereof.

It also relates to a kit for labelling Gram-positive bacteria in flow cytometry, in particular for complex samples such as human or animal microbiota samples.

In particular, the invention relates to the use of a kit for labelling bacteria, in particular in methods forming the subject of the invention, in flow cytometry, combining a lectin—wheat lectin (wheat germ agglutinin (WGA))—coupled to a fluorochrome, with an antibiotic—vancomycin—coupled to a fluorochrome emitting a fluorescence at a different wavelength from that coupled to WGA. Optionally, the kit can comprise vancomycin that is not coupled to a fluorochrome (unlabelled) and/or potassium chloride. The kit is useful for fluorescence detection of Gram-positive bacteria, in particular by coupling relative fluorescence measurements of the two different fluorochromes. These relative fluorescence measurements make it possible to distinguish Gram-positive bacteria families from one another. They also make it possible to distinguish the bacteria genera from one another. They also make it possible to distinguish species of Gram-positive bacteria such as *Bacillus subtilis, Lactococcus lactis, Staphylococcus aureus, Enterococcus faecalis*, and *Lactobacillus* spp., from one another. This list is not exhaustive and it would be possible to distinguish between numerous aerobic or anaerobic species, such as *Clostridium* and *Faecalibacterium*.

Human gut microbiota, commonly called "gut flora", are the group of microorganisms (bacteria, yeasts and fungi) that are present in the human gastrointestinal system (stomach, intestine and colon). The bacterial diversity is currently estimated at approximately $10^3$ bacterial species making up the main gut microbiota of an adult individual, with a quantity of $10^{14}$ bacteria, representing a bacterial metagenome of 200,000 to 800,000 genes in each individual, i.e. 10 to 50 times the number of genes in the human genome. Thus, the human gut microbiota is a highly diverse and complex ecosystem that is specific to each individual.

Flow cytometry represents an interesting technique compared with culture-based methods for studying complex ecosystems such as gut microbiota. Initially designed for cell analysis, flow cytometry has been adapted in order to characterize and count microbial populations. It is in particular used for microbial characterization such as determining antibiotic susceptibility [Saint-Ruf, C., et al., Antibiotic Susceptibility Testing of the Gram-Negative Bacteria Based on Flow Cytometry. Frontiers in Microbiology, 2016. 7 and Pereira, P. M., et al., Fluorescence ratio imaging microscopy shows decreased access of vancomycin to cell wall synthetic sites in vancomycin-resistant *Staphylococcus aureus*. *Antimicrob Agents Chemother*, 2007. 51(10): p. 3627-33], analysing differentiation during biofilm formation, evaluating the viability of populations or even differentiating Gram-positive and Gram-negative bacteria. In flow cytometry, discriminating between Gram-positive and Gram-negative bacteria is different from the conventional Gram staining technique, which is based only on the presence or absence of the outer membrane. In cytometry the discrimination can be carried out using the presence of structures that are more or less expressed at the surface of the bacteria or are more or less accessible. Thus, this targeting sometimes makes it possible to observe a more precise discrimination of bacterial populations.

Determining the Gram status of the microbial populations present in complex samples can be carried out with stains using gentian violet and safranin or fuchsin, for example. The bacterial suspensions must be fixed to a slide before staining can be carried out, which alternates the different dyes, fixers, decolorizers, as well as the washing and drying steps. These techniques can thus be time-consuming and the results obtained can be variable. In fact, depending on the decolorizers used, often acetone and ethanol, and the exposure time, the identification results can be different and can lead to an incorrect interpretation of the Gram status of the sample analysed. In order to ensure the reproducibility of the results, new techniques for Gram-status identification have been developed. This leads to the use of fluorescent labelling agents to carry out microscopy analyses or, increasingly, flow cytometry analyses.

Patent WO 02/057482 describes the use of the lectin WGA labelled with the fluorochrome Oregon Green® combined with a DNA marker. This combination makes it possible to determine the percentage of Gram-positive and of Gram-negative bacteria in a pure culture mixture of different bacteria or a milk sample. The lectin WGA coupled to another fluorochrome, fluorescein isothiocyanate, has also been used to analyse acidophilic bacteria and archaea bacteria [FIFE, D. J., et al., Evaluation of a Fluorescent Lectin-Based Staining Technique for Some Acidophilic Mining Bacteria. Appl Environ Microbiol, 2000. 66(5): p. 2208-2210].

One of the drawbacks of using WGA is its capacity to fix itself to particular structures that are present in Gram-positive bacteria but not necessarily specific to these bacteria. Some of the structures recognized through WGA can also be found in Gram-negative bacteria.

Methods and the kit of the present invention have been developed to allow a more accurate discrimination between Gram-positive and Gram-negative bacteria, regardless of the viability of the sample analysed and regardless of whether the bacteria are aerobic or anaerobic. The methods can be applied to complex samples such as microbiota samples. They can also be applied to (non-complex) samples of bacterial cultures.

SUMMARY OF THE INVENTION

The present invention relates to a method for detecting, in a sample containing bacteria, the proportion of Gram-positive bacteria and the proportion of Gram-negative bacteria, comprising the steps of:
a) incubating the sample, simultaneously or sequentially, with:
   wheat lectin (wheat germ agglutinin (WGA)) coupled to a fluorochrome,
   vancomycin coupled to a fluorochrome emitting a fluorescence at a different wavelength from that coupled to WGA, optionally vancomycin that is not coupled to a fluorochrome (unlabelled),
optionally potassium chloride.
b) centrifuging the sample,
c) optionally washing the sample,
d) measuring the fluorescence of the sample.

According to an embodiment of the invention, the fluorochrome coupled to WGA is Alexa Fluor® 647 and the fluorochrome coupled to vancomycin is 3-BODIPY-propanoic acid.

According to an embodiment of the invention, the measurement step is carried out in less than 40 minutes, preferably in less than 30 minutes, after the end of step c).

According to an embodiment of the invention, the measurement step d) is carried out with a flow cytometer.

According to an embodiment of the invention, in step a), the concentration of wheat lectin (wheat germ agglutinin (WGA)) coupled to a fluorochrome in the sample to be analysed is from 5 to 100 µg/ml, preferably 20 µg/ml and/or the final concentration of vancomycin coupled to a fluorochrome in the sample to be analysed is from 0.15 to 4 µg/ml, preferably 2 µg/ml.

According to an embodiment of the invention, the incubation time in step a) is from 10 to 30 minutes, preferably 15 minutes.

According to an embodiment of the invention, the sample is a sample of human or animal microbiota.

According to an embodiment of the invention, the sample is a bacterial culture.

The present invention also relates to a method for detecting, optionally distinguishing and optionally identifying families, genera and/or species of Gram-positive and Gram-negative bacteria in a bacterial sample, comprising the steps of:
a) incubating the sample, simultaneously or sequentially, with:
wheat lectin (wheat germ agglutinin (WGA)) coupled to a fluorochrome,
vancomycin coupled to a fluorochrome emitting a fluorescence at a different wavelength from that coupled to WGA,
optionally vancomycin,
optionally potassium chloride,
b) centrifuging the sample,
c) optionally washing the sample,
d) measuring the fluorescence of the sample
e) analysing the relative fluorescences of the two fluorochromes
f) optionally distinguishing and optionally identifying families, genera and/or species of Gram-positive and Gram-negative bacteria.

According to an embodiment of the invention, the fluorochrome coupled to WGA is Alexa Fluor® 647 and the fluorochrome coupled to vancomycin is 3-BODIPY-propanoic acid.

The present invention also relates to the use of a kit for labelling Gram-positive bacteria in the abovementioned methods. Thus, the invention relates to the use of a kit for labelling Gram-positive bacteria, in flow cytometry, the kit comprising:
i. wheat lectin (wheat germ agglutinin (WGA)) coupled to a fluorochrome,
ii. vancomycin coupled to a fluorochrome emitting a fluorescence at a different wavelength from that coupled to WGA, and
iii. optionally vancomycin,
iv. optionally potassium chloride.

According to an embodiment of the invention, the fluorochromes are selected from the group of the Alexa Fluor® labelling agents, 3-BODIPY-propanoic acid or one of its derivatives, fluorescein or one of its derivatives, salts or esters, Cy labelling agents, CF labelling agents, conjugated fluorochromes.

According to an embodiment of the invention, the fluorochrome coupled to WGA is selected from the Alexa Fluor® labelling agents, fluorescein or one of its derivatives, salts or esters.

According to an embodiment of the invention, the fluorochrome coupled to vancomycin is selected from 3-BODIPY-propanoic acid or one of its derivatives, fluorescein or one of its derivatives, salts or esters, in particular FITCH.

According to an embodiment of the invention, the fluorochrome coupled to WGA is Alexa Fluor® 647 and the fluorochrome coupled to vancomycin is 3-BODIPY-propanoic acid.

DESCRIPTION OF THE FIGURES

FIGS. 3A and 3B: Results of the experiment described in Example 3. FIG. 3A shows the geometric mean of the fluorescences obtained, for the different species tested, at a wavelength of 540 nm±15 nm, which corresponds to the fluorescence of vancomycin coupled to BODIPY® FL. The graph in FIG. 3B shows the geometric mean of the fluorescences obtained, for the different species tested, at a wavelength of 670 nm±15 nm, which corresponds to the fluorescence of WGA coupled to Alexa Fluor® 647®.

DETAILED DESCRIPTION

While seeking means for more accurately determining Gram-positive bacteria, the inventors have developed a kit and a method based on the combination of a lectin, WGA, and an antibiotic, vancomycin, coupled to fluorochromes emitting fluorescence at different wavelengths. This combination makes it possible to analyse the proportion of Gram-positive and Gram-negative bacteria in complex samples, such as microbiota samples, using flow cytometry.

By "Gram-positive bacteria" is meant bacteria that are highlighted by Gram staining (gentian violet). By "Gram-negative bacteria" is meant bacteria that are not highlighted by Gram staining.

Bulky vancomycin (1,500 to 2,000 daltons) is a glycopeptide that inhibits the synthesis of the bacteria peptidoglycan by fixing to the terminal D-Ala-D-Ala chains. These structures are also found in Gram-negative bacteria, but are not accessible to vancomycin due to the presence of the outer membrane. Moreover, vancomycin is too bulky to pass through the pores of the outer membrane of Gram-negative bacteria. On the other hand, vancomycin does not fix to resistant bacteria that do not have this D-Ala-D-Ala chain and therefore does not label them.

WGA, unlike vancomycin, is not specific to Gram-positive bacteria. It fixes preferentially and differentially on these bacteria due to their recognition of structures more or less present in Gram-positive bacteria, sialic acid and N-acetyl-D-glucosamine. *Streptococcus agalactiae*, more commonly known by the name *Streptococcus* B (SGB), which has a large amount of sialic acid in its wall, leading to significant labelling by WGA, can be given as an example.

Adding WGA as well as vancomycin makes it possible to strengthen the identification of Gram-positive bacteria that could be resistant to vancomycin and thus not identified with this antibiotic alone. Thus, this combination of these two labelling agents—vancomycin coupled to the first fluorochrome and WGA coupled to the second fluorochrome—represents a combination of interest not only to discriminate Gram-positive and Gram-negative populations, but also to be able to generate a fluorescent signature signal of the Gram-positive bacteria species present in the sample. This information makes it possible to characterize complex bacterial populations, such as those typical of microbiota samples, in particular human and animal samples.

Examples of fluorochromes include, but are not limited to, Alexa Fluor® labelling agents, BODIPY®, fluorescein or one of its derivatives, salts or esters, labelling agents Oregon Green® 488 and Oregon Green® 514, labelling agents Rhodamine Green and Rhodamine Green-X, eosin, tetramethylrhodamine, labelling agents Lissamine Rhodamine B and Rhodamine Red-X, X-Rhodamine, labelling agents Texas Red® and Texas Red®-X, naphthofluorescein or one of its derivatives, salts or esters, Carboxyrhodamine 6G, QSY labelling agents: fluorescence deactivators, non-fluorescent malachite green, coumarin derivatives, labelling agent Pacific Orange, Cascade Blue and other pyrene derivatives, Cascade Yellow and other pyridyloxazole derivatives, naphthalenes (for example dansyl chloride), the labelling agent dapoxyl, bimane, 1-dimethylamine-N(2-azidoethyl) naphthalene-5-sulfonamide, 6-(6-amino-2-(2-azidoethyl)1, 3-dioxo-1H-benzo(de)-2(3H)isoquinoline, 6-(6-amino-2-(2-propinyl)1,3-dioxo-1H-benzo(de)-2(3H)isoquinoline, 8-(4-azidoethyloxyphenyl)-2,6-diethyl-1,3,5,7-tetramethyl-4,4-difluoro-4-bora-3a,4a-diaza-s-indacene, 8-(4-propynyloxyphenyl)-2,6-diethyl-1,3,5,7-tetra methyl-4,4-difluoro-4-bora-3a,4a-diaza-s-indacene, 1-(3-azido-propoxy)-7-methylamino-phenoxazin-3-one, 1-(2-propynyl)-7-methyl-amino-phenoxazin-3-one, N-(5-(3-azidopropylamino)-9H-benzo(a)-phenoxazin-9-ylidene)-N-methyl-methanaminium chloride, N-(5-(3-propynyl-amino)-9H-benzo(a)-phenoxazin-9-ylidene)-N-methyl-methanaminium chloride, (9-(3-azido-propoxy)-7-piperidin-1-yl-phenoxazin-3-ylidene)-dimethyl-ammonium perchlorate. There may also be mentioned the derivative(s) of 4-methylumbelliferone, 1-(2-benzoylphenyl)-6-chloro-1H-indol-3-yl-beta-glucopyranoside; 1-(2-benzoylphenyl)-6-chloro-1H-indol-3-yl-beta-galactopyranoside; 1-(2-benzoylphenyl)-6-chloro-1H-indol-3-yl-acetate; 1-(2-benzoylphenyl)-6-chloro-1H-indol-3-yl-phosphate, 8-hydroxypyrene-1,3,6-trisulfonic acid (HPTS), a cyanine compound or one of its derivatives. See also Kele et al. (2009) Org. Biomol. Chem. 7:3486-3490; Nagy et al. (2010) Chem. Asian J. 5:773-777; Filnov et al. (2011) Nat. Biotechnol. 29:757-761; Subach et al. (2011) Nature Methods 8:771-777; Yang et al. (2011) J. Am. Chem. Soc. 133:9964-9967; Zin (2011) Nature Methods 8:726-728; and "Fluorophores and their amine-reactive derivatives", Chapter 1.

The fluorochromes in Table 1 below may be mentioned as fluorochromes preferred for use in the invention:

| Conjugated fluorochromes | | | | | |
|---|---|---|---|---|---|
| Fluorochrome (name) | Excitation λ (nm) | Emission λ (nm) | MW | Notes | CAS Number |
| Hydroxycoumarin | 325 | 386 | 331 | Succinimidyl Ester | 43070-85-5 |
| Aminocoumarin | 350 | 445 | 330 | Succinimidyl Ester | 30230-57-0 |
| Methoxycoumarin | 360 | 4:10 | 317 | Succinimidyl Ester | |
| Cascade Blue | (375); 401 | 423 | 596 | Hydrazide | |
| Pacific Blue | 403 | 455 | 406 | Maleimide | |
| Pacific Orange | 403 | 551 | | | 1122414-42-9 |
| Lucifer Yellow | 425 | 528 | | | 82446-52-4 |
| NBD | 466 | 539 | 294 | NBD-X | |
| R-Phycoerythrin (PE) | 480; 565 | 578 | 240 k | | 11016-17-4 |
| PE-Cy5 conjugates | 480; 565; 650 | 670 | | aka Cychrome, R670, Tri-Color, Quantum Red | |
| PE-Cy7 conjugates | 480; 565; 743 | 767 | | | |
| Red 613 | 480; 565 | 613 | | PE-Texas Red | |
| PerCP | 490 | 675 | | Peridinin Chlorophyll Protein | |
| TruRed | 490, 675 | 695 | | PerCP-Cy5,5 conjugate | 396076-95-2 |
| FluorX | 494 | 520 | 587 | (GE Healthcare) | |
| Fluorescein | 495 | 519 | 389 | FITC; pH sensitive | 232:1-07-5 |
| BODIPY ® FL | 503 | 512 | | | 165599-63-3 |
| TRITC | 547 | 572 | 444 | TRITC | 107347-53-5 |
| X-Rhodamine | 570 | 576 | 548 | XRITC | |
| Lissamine Rhodamine B | 570 | 590 | | | 3520-424 |
| Texas Red | 589 | 615 | 625 | Sulfonyl Chloride | 82354-19-6 |
| Allophycocyanin (APC) | 650 | 660 | 104 k | | 874103-50-1, 874103-51-2 |
| APC-Cy7 conjugates | 650; 755 | 767 | | PharRed | |

| Alexa Fluor ® labelling agents | | | | | |
|---|---|---|---|---|---|
| Fluorochrome | Excitation λ (nm) | Emission λ (nm) | MW | Deactivator | CAS Number |
| Alexa Fluor ® 350 | 343 | 442 | 410 | | 24463644-4 |
| Alexa Fluor ® 405 | 401 | 421 | 1028 | | 791637-08-6 |
| Alexa Fluor ® 430 | 434 | 540 | 702 | | |
| Alexa Fluor ® 488 | 499 | 519 | 643 | QY 0.92 | 247144-99-6 |
| Alexa Fluor ® 500 | 503 | 525 | 700 | | 798557-08-1 |
| Alexa Fluor ® 514 | 517 | 542 | 714 | | 798557-07-0 |
| Alexa Fluor ® 532 | 530 | 555 | 724 | QY 0.61 | 24714541-5 |
| Alexa Fluor ® 546 | 561 | 572 | 1079 | QY 0.79 | 247145-23-9 |
| Alexa Fluor ® 555 | 553 | 568 | 1250 | QY 0.1 | 644990-77-2 |
| Alexa Fluor ® 568 | 579 | 603 | 792 | QY 0.69 | 247145-38-6 |
| Alexa Fluor ® 594 | 591 | 618 | 820 | QY 0.66 | 247145-86-4 |
| Alexa Fluor ® 610 | 610 | 629 | 1285 | | 900528-62-3 |
| Alexa Fluor ® 633 | 632 | 648 | 1200 | | 477780-06-6 |
| Alexa Fluor ® 647 | 652 | 668 | 1300 | QY 0.33 | 400051-23-2 |
| Alexa Fluor ® 660 | 663 | 691 | 1100 | | 422309-89-5 |

-continued

| Conjugated fluorochromes | | | | |
|---|---|---|---|---|
| Alexa Fluor ® 680 | 680 | 702 | 1150 | 422309-67-9 |
| Alexa Fluor ® 700 | 696 | 719 | 1400 | 697795-05-4 |
| Alexa Fluor ® 750 | 752 | 776 | 1300 | 697795-06-5 |
| Alexa Fluor ® 790 | 782 | 804 | 1750 | 950891-33-5 |

The structures of several Alexa Fluor® labelling agents are shown below:

Alexa Fluor® 350

Alexa Fluor® 405

Alexa Fluor® 430

Alexa Fluor® 486

Alexa Fluor® 514

Alexa Fluor® 532

Alexa Fluor® 546

Alexa Fluor® 568

Alexa Fluor® 594

Alexa Fluor® 610

Alexa Fluor® 647

| Cy labelling agents | | | | |
|---|---|---|---|---|
| Fluorochrome | Excitation λ (nm) | Emission λ (nm) | MW | Deactivator |
| Cy2 | 489 | 506 | 714 | QY 0.12 |
| Cy3 | (512); 550 | 570; (615) | 767 | QY 0.15 |
| Cy3B | 558 | 572; (620) | 658 | QY 0.67 |
| Cy3.5 | 581 | 594,(640) | 1102 | QY 0.15 |
| Cy5 | (625); 650 | 670 | 792 | QY 0.28 |
| Cy5.5 | 675 | 694 | 1128 | QY 0.23 |
| Cy7 | 743 | 767 | 818 | QY 0.28 |

| CF labelling agents See for example the website: https://biotium.com/product/wheat-germ-agglutinin-wga-cf-dye-conjugates/ | |
|---|---|
| Conjugation | Ex/Em |
| CF ®350 | 347/448 nm |
| CF ®405S | 404/431 nm |
| CF ®405M | 408/452 nm |
| CF ®488A | 490/515 nm |
| CF ®532 | 527/558 nm |
| CF ®555 | 555/565 nm |
| CF ®568 | 562/583 nm |
| CF ®594 | 593/614 nm |
| CF ®633 | 630/650 nm |
| CF ®640R | 642/662 nm |
| CF ®680 | 681/698 nm |
| CF ®680R | 680/701 nm |
| CF ®770 | 770/797 nm |

According to an embodiment of the invention, the fluorochrome coupled to WGA is selected from the CF® labelling agents from the supplier Biotium (CA, United States) (see the table "CF labelling agents" above).

According to an embodiment of the invention, the fluorochrome coupled to WGA is selected from the labelling agents from the supplier Invitrogen/Molecular Probes (Carlsbad, CA, United States) such as tetramethylrhodamine, Texas Red-X, Qdot 655, Oregon Green 488.

According to an embodiment of the invention, the fluorochrome coupled to WGA is selected from the fluoresceins, in particular fluorescein 5-isothiocyanate (CAS Number 3326-32-7), better known to a person skilled in the art by its commercial name, FITC. MP Biomedicals (Santa Ana, CA, United States) may be mentioned as an example of a supplier.

According to an embodiment of the invention, the fluorochrome coupled to WGA is Alexa Fluor® 647 (CAS Number 400051-23-2). It is readily available on the market from several suppliers. Invitrogen/Molecular Probes (Carlsbad, CA, United States) may be mentioned as an example of suppliers.

The Chemical Structure of Alexa Fluor®

According to an embodiment of the invention, the fluorochrome coupled to vancomycin is selected from 3-BODIPY-propanoic acid or one of its derivatives, salts or esters, the fluoresceins or one of their derivatives, salts or esters, in particular fluorescein 5-isothiocyanate (CAS Number 3326-32-7), better known to a person skilled in the art by its commercial name, FITC. Invitrogen/Molecular Probes (Carlsbad, CA, United States) may be mentioned as an example of a supplier.

According to an embodiment of the invention, the fluorochrome coupled to vancomycin is selected from 3-BODIPY-propanoic acid (CAS Number 165500-63-3), better known to a person skilled in the art by its commercial name, BODIPY FL®, or one of its derivatives, salts or esters. Isothiocyanate esters, succinimidyl and sulfonated succinimidyl may be mentioned as esters. The name BODIPY corresponds to boron dipyrromethene. The IUPAC name for the BODIPY core is 4,4-difluoro-4-bora-3a,4a-diaza-s-indacene.

According to an embodiment of the invention, 3-BODIPY-propanoic acid (BODIPY FL®) is the particularly preferred fluorochrome for being coupled to vancomycin. BODIPY® FL is available on the market. Invitrogen/Molecular Probes (Carlsbad, CA, United States) may be mentioned as an example of suppliers.

The chemical structure of BODIPY® FL is shown below:

According to a preferred embodiment of the invention, WGA is coupled to the fluorochrome Alexa Fluor® 647 and vancomycin is coupled to BODIPY FL®.

WGA is available on the market. For example, Sigma Aldrich (Saint-Louis, MO, United States) and MP Biomedicals (Santa Ana, CA, United States) may be mentioned. WGA is normally supplied in the form of a lyophilizate ready to be reconstituted with water or another suitable liquid, preferably an aqueous solution. Coupling WGA with a fluorochrome is carried out according to methods known to a person skilled in the art. A certain number of WGA-fluorochromes, such as Alexa Fluor® WGA-fluorochromes, are available on the market. For example, the following suppliers may be mentioned: Invitrogen/Molecular Probes (Carlsbad, CA, United States), Sigma Aldrich (Saint-Louis, MO, United States) and Biotium (CA, United States).

Vancomycin is available on the market, for example Sigma Aldrich (Saint-Louis, MO, United States) and Merck Millipore (Burlington, MA, United States) may be mentioned as suppliers. Vancomycin can be supplied in the form of a powder ready to be reconstituted with water or a suitable aqueous solution. It can also be supplied as a solution. Coupling vancomycin with a fluorochrome is carried out according to methods known to a person skilled in the art. A certain number of vancomycin-fluorochromes are available on the market. For example, Invitrogen/Molecular Probes (Carlsbad, CA, United States) may be mentioned as supplier.

The inventors have observed that adding potassium chloride (KCl) at a concentration between 0.3M and 3M makes it possible to improve the WGA labelling for certain Gram-positive bacteria, for example *Enterococcus faecalis* and *Lactococcus lactis*, and to enhance the WGA and vancomycin labelling for other Gram-positive bacteria, for example *Bacillus subtilis*, but without enhancing the labelling of Gram-negative bacteria. Thus, according to an embodiment of the invention, labelling the bacteria of the sample to be analysed comprises a step of incubation with KCl at a final concentration between 0.3M and 3M, preferably 1M. Preferably, incubation with KCl takes place at the same time as incubation with the labelling agents, WGA coupled to a fluorochrome and vancomycin coupled to a fluorochrome.

The inventors have also confirmed that adding vancomycin that is not coupled to a fluorochrome (unlabelled vancomycin) improves the labelling of certain strains, such as for *E. faecalis*. It is known, for example, that BODIPY® FL vancomycin does not fix easily to *B. subtilis* and that adding unlabelled vancomycin as well as BODIPY® FL vancomycin could improve this labelling.

Thus, according to an embodiment of the invention, labelling the bacteria of the sample to be analysed can be carried out with a mixture of unlabelled vancomycin and vancomycin coupled to a fluorochrome. The ratio between the unlabelled vancomycin and the vancomycin coupled to a fluorochrome can be between 0.3 and 2.4, preferably between 0.75 and 1.25, more preferably 1.

The inventors have thus developed a kit for detecting, in a sample containing bacteria, the proportion of Gram-positive bacteria and the proportion of Gram-negative bacteria. In general, the kit is implemented in flow cytometry methods.

In general, the kit for labelling Gram-positive bacteria comprises:
  i. wheat lectin (wheat germ agglutinin (WGA)) coupled to a fluorochrome,
  ii. vancomycin coupled to a fluorochrome emitting a fluorescence at a different wavelength from that coupled to WGA, and
  iii. optionally unlabelled vancomycin,
  iv. optionally potassium chloride (KCl).

According to an embodiment of the invention, the kit for labelling Gram-positive bacteria comprises:
  i. a lyophilizate or a solution of wheat lectin (wheat germ agglutinin (WGA)) coupled to a fluorochrome,
  ii. a powder or solution of vancomycin coupled to a fluorochrome emitting a fluorescence at a different wavelength from that coupled to WGA,
  iii. optionally unlabelled vancomycin in the form of a powder or a solution,
  iv. optionally potassium chloride, in the form of a powder or a solution.

According to an embodiment of the invention, the kit for labelling Gram-positive bacteria comprises:
  i. a lyophilizate or a solution of wheat lectin (wheat germ agglutinin (WGA)) coupled to Alexa Fluor® 647 (CAS Number 400051-23-2),
  ii. a powder or solution of vancomycin coupled to 3-BODIPY-propanoic acid (CAS Number 165500-63-3), better known to a person skilled in the art by its commercial name, BODIPY® FL,
  iii. optionally vancomycin (unlabelled),
  iv. optionally potassium chloride (KCl).

According to an embodiment of the invention, in the kit, the solution of vancomycin coupled to BODIPY® FL has a concentration of 0.2 to 4 µg/ml.

According to an embodiment of the invention, in the kit, the solution of wheat lectin (wheat germ agglutinin (WGA)), coupled to Alexa Fluor® 647 (CAS Number 165500-63-3), has a concentration of 5 to 100 µg/ml.

The invention also relates to a method for detecting, in a sample containing bacteria, the proportion of Gram-positive bacteria and the proportion of Gram-negative bacteria. The kit described above is designed to implement the method of the invention. In general, the method comprises the steps of:
a) incubating the sample containing bacteria, simultaneously or sequentially, with
   wheat lectin (wheat germ agglutinin (WGA)) coupled to a fluorochrome,
   vancomycin coupled to a fluorochrome emitting a fluorescence at a different wavelength from that coupled to WGA,
   optionally vancomycin,
   optionally potassium chloride,
b) centrifuging the sample,
c) optionally washing the sample,
d) measuring the fluorescence of the sample.

Typically, step d) is carried out with a flow cytometer at suitable wavelengths according to the selected fluorochromes. In general, step d) is carried out in less than 40 minutes, preferably in less than 30 minutes after the end of step c).

According to an embodiment of the invention, the method can comprise a fixing step which can take place before or after the labelling. According to an embodiment of the invention, the fixing step can take place between step c) and step d). This fixing step stabilizes the dispersion of light and the labelling of the sample for up to approximately one week if the sample is kept at approximately 4° C. in darkness.

For example, the sample can be incubated with paraformaldehyde (PFA) at a concentration, for example, of 1% (v/v) for a period of approximately 30 minutes to one hour and thirty minutes, at ambient temperature for example. A person skilled in the art knows how to adapt the conditions of this fixing step. If a fixing step takes place, it is generally followed by at least one, preferably two, centrifugations, from 3,200 g to 15,000 g for 5-20 minutes to remove any PFA residue. The fixing step thus makes it possible to extend the time period between the end of the labelling (step c)) and step d) and allows to be flexible in the planning of the handling time.

According to an embodiment of the invention, the fixing step can also take place before step a). In this case, it is possible to "fix" the state of the cells to be analysed before carrying out labelling (step a)). This makes it possible to extend the time before labelling without significant modification of the cell state.

According to an embodiment of the invention, the sample of cells of step a) has a concentration of $10^4$ to $10^9$ cells/ml, preferably from $10^5$ to $10^7$ cells/ml. WGA coupled to a fluorochrome, vancomycin coupled to a fluorochrome, optionally unlabelled vancomycin and optionally KCl can be added to the cell sample one after the other, or simultaneously. Preferably, they are added simultaneously. Typically, the labelling solution is prepared with all the labelling agents, optionally including unlabelled vancomycin and KCl.

According to an embodiment of the invention, the final concentration of WGA coupled to a fluorochrome in the sample is from 5 to 100 µg/ml, preferably from 10 to 30 µg/ml, more preferably 20 µg/ml, in the sample to be tested.

According to an embodiment of the invention, the final concentration of vancomycin coupled to a fluorochrome in the sample is from 0.15 to 4 µg/ml, preferably 2 µg/ml, in the sample to be tested.

According to an embodiment of the invention, the unlabelled vancomycin is incorporated during the incubation step a). In this case, the unlabelled vancomycin and the vancomycin coupled to a fluorochrome can be present at a ratio between 0.25 and 2.25, preferably at a ratio of 1. According to an embodiment of the invention, the unlabelled vancomycin and the vancomycin coupled to a fluorochrome can be present at a concentration of 0.15 to 4 µg/ml in the sample to be tested. According to an embodiment of the invention, the unlabelled vancomycin and the vancomycin coupled to a fluorochrome can be present at a concentration of 2 µg/ml each in the sample to be tested.

In general, the incubation is carried out under standard conditions known to a person skilled in the art. For example, the sample is incubated in darkness with the labelling agents for 10 to 30 minutes, preferably for 15 minutes at ambient temperature. A person skilled in the art knows that the incubation time can be longer if the incubation temperature is lower, and shorter if the incubation temperature is higher.

The centrifugation step b) is carried out under normal conditions known to a person skilled in the art. According to an embodiment of the invention, the centrifugation step b) is carried out from 3,200 g to 15,000 g for 5-20 minutes.

According to an embodiment of the invention, the washing step c) is carried out with a buffered saline solution conventionally called PBS (Phosphate Buffer Saline) or a sodium chloride solution at approximately 0.9%.

According to an embodiment of the invention, the step d) of measuring the fluorescence of the sample is carried out with a flow cytometer. The Influx cytometer from BD Biosciences (New Jersey, United States) and the BD Accuri™ C6 cytometer from BD Biosciences (New Jersey, United States) may be mentioned as a supplier of such devices.

Typically, the cytometer is fitted with a 488 nm laser (power of 200 mW), 405 nm laser (power of 100 mW) and 640 nm laser (power of 120 mW). The 488 nm wavelength laser is used to excite the vancomycin and its fluorescence is collected through the 540/30 nm (540±15 nm) passband. The WGA is excited with the 640 nm laser and its fluorescence is collected through the 670/30 nm (670±15 nm) passband. Before the samples pass through, the device can be calibrated to ensure the best quality of the results. Typically, a sample throughput can range from 500 events per second to 5,000 events per second. Recordings of approximately 40,000 to 60,000 events can be carried out. A person skilled in the art knows that the number of events can vary according to the cytometer used. According to an embodiment of the invention, the concentration of the labelled bacteria is approximately $10^5$ to $10^7$, preferably approximately $10^6$ CFU/mL.

Figure 1:
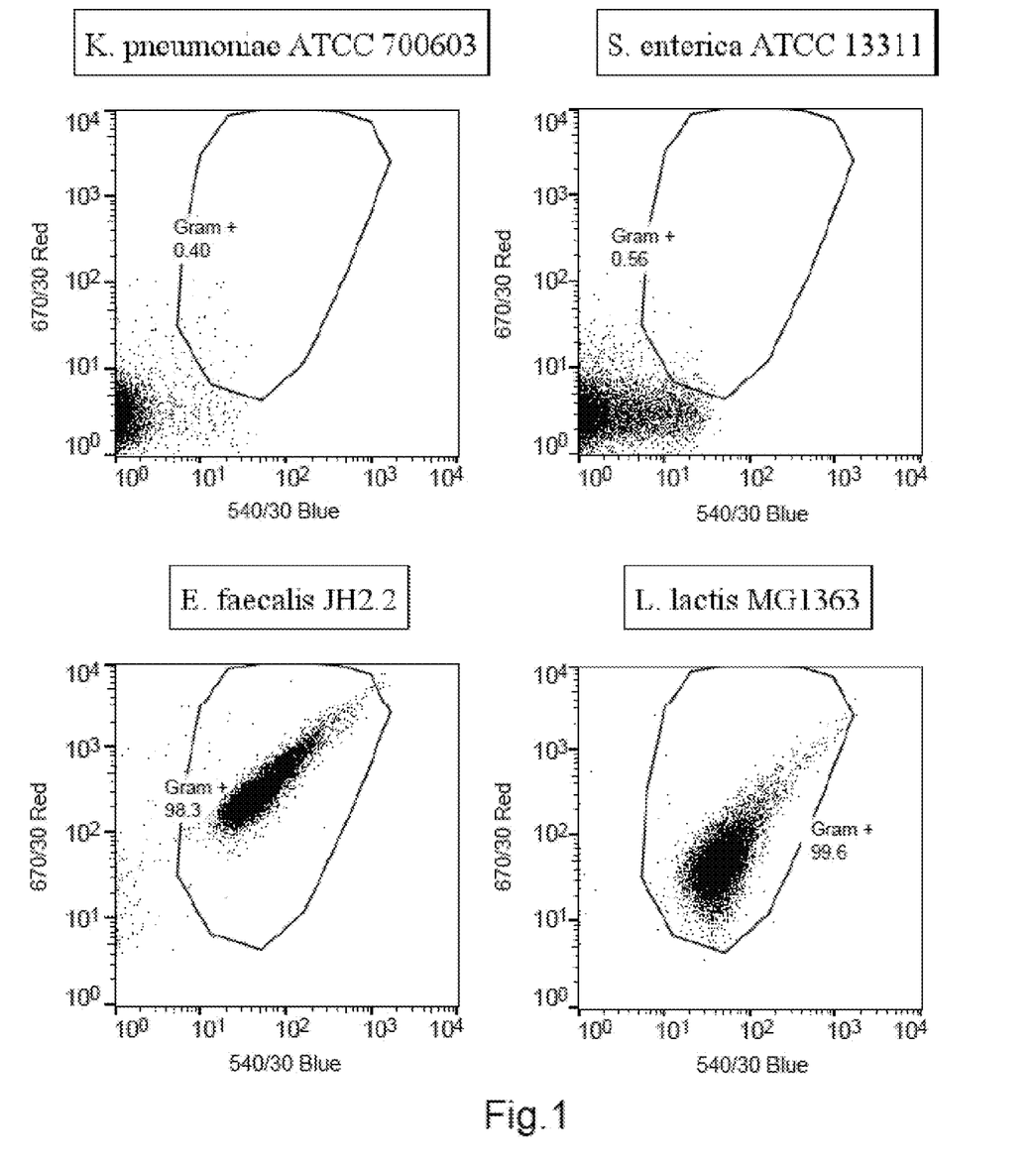
FIG. 1: Flow cytometry results of Example 1. The X axis shows the intensity of the fluorescence at a wavelength of 540 nm±15 nm, which corresponds to the fluorescence of vancomycin coupled to BODIPY® FL. The Y axis shows the intensity of the fluorescence at a wavelength of 670 nm±15 nm, which corresponds to the fluorescence of WGA coupled to Alexa Fluor® 647.
Figure 2:
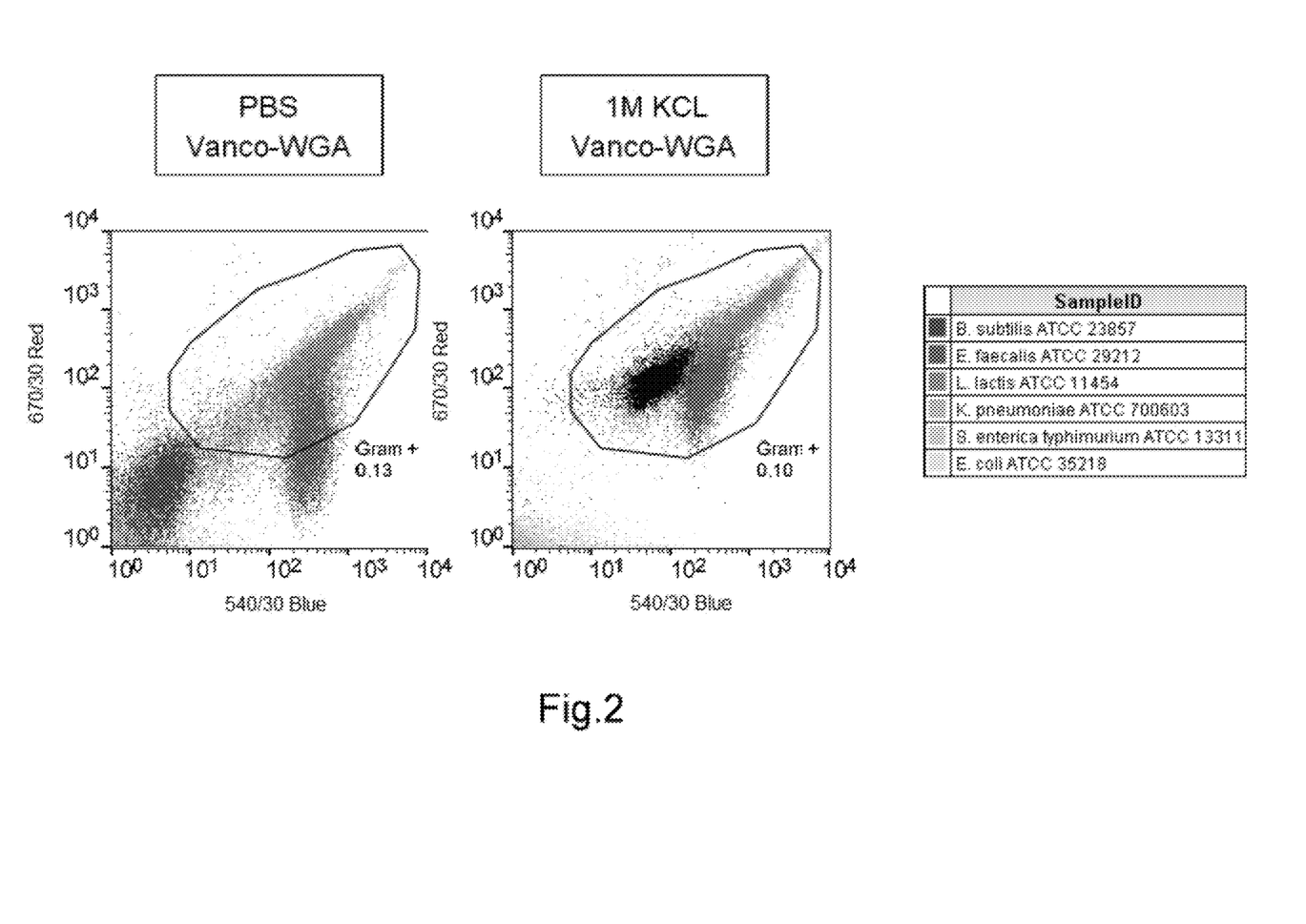
FIG. 2: Flow cytometry results of Example 2. The X axis shows the intensity of the fluorescence at a wavelength of 540 nm±15 nm, which corresponds to the fluorescence of vancomycin coupled to BODIPY® FL. The Y axis shows the intensity of the fluorescence at a wavelength of 670 nm±15 nm, which corresponds to the fluorescence of WGA coupled to Alexa Fluor® 647.

Examples 1 and 2 and FIGS. 1 and 2 show the effectiveness of two embodiments of the invention using vancomycin coupled to BODIPY® FL and WGA coupled to Alexa Fluor® 647 without the addition of KCl (Example 1) and with the addition of 1M KCl (Example 2). The addition of KCl makes it possible to improve the labelling of *Bacillus subtilis*. In both examples, the Gram-negative species are not labelled and the Gram-positive species are well labelled.

By analysing the relative fluorescence of the two fluorochromes, the inventors found that different families, genera, and/or species of bacteria had their own specific fluorescence signature. Thus, another subject of the invention is a method for detecting and optionally distinguishing and identifying specific families, genera, and/or species of Gram-positive bacteria in a sample containing bacteria.

The method comprises the steps described above, but also a step e) of analysing the relative fluorescence of the two fluorochromes.

Typically, the method comprises the following steps:
a) incubating the sample, simultaneously or sequentially, with:
   wheat lectin (wheat germ agglutinin (WGA)) coupled to a fluorochrome,
   vancomycin coupled to a fluorochrome emitting a fluorescence at a different wavelength from that coupled to WGA,
   optionally vancomycin,
   optionally potassium chloride,
b) centrifuging the sample,
c) optionally washing the sample,
d) measuring the fluorescence of the sample,
e) analysing the relative fluorescences of the two fluorochromes
f) detecting and optionally distinguishing and identifying families, genera and/or species of Gram-positive and Gram-negative bacteria.

According to an embodiment, in step f), families, genera and/or species of Gram-positive and Gram-negative bacteria are distinguished and identified. According to an embodiment of the invention, an optional fixing step with, for example, a suitable paraformaldehyde solution can take place between step c) and step d), or before step a).

The analysis step e) can be carried out with suitable software, for example FlowJo© (FlowJo LLC, Ashland, Oregon, United States).

Analysing the relative fluorescences of the two fluorochromes makes it possible to distinguish genera from one another, species from one another and even strains from one another. This is possible regardless of the viability of the sample analysed and also regardless of whether the bacteria are aerobic or anaerobic.

According to an embodiment of the invention, the fluorescence signature obtained will make it possible not only to distinguish, but also to identify the families, genera and/or species present in the sample. This is possible by comparing the signatures obtained from the sample with reference signatures of the species.

According to an embodiment of the invention, the analysis of the relative fluorescences of the two fluorochromes makes it possible to distinguish Gram-positive bacteria families from one another because each family will have a fluorescence signature of its own.

For example, it is possible to distinguish the following families from one another: Bacillaceae, Enterococcaceae, Lactobacillaceae, Streptococcaceae, Bifidobacteriaceae, Ruminococcaceae, Clostridiaceae, Lachnospiraceae. This list is not exhaustive.

According to an embodiment of the invention, analysing the relative fluorescences of the two fluorochromes makes it possible to distinguish Gram-positive bacteria genera from one another because each genus will have a fluorescence signature of its own.

For example, it is possible to distinguish the following genera from one another: *Bacillus, Lactococcus, Staphylococcus, Bifidobacterium, Enterococcus, Lactobacillus, Clostridium, Blautia, Roseburia, Eubacterium, Anaerostipes* and *Faecalibacterium* for example. This list is not exhaustive.

The invention makes it possible to distinguish anaerobic Gram-positive bacteria from anaerobic Gram-negative bacteria. It also makes it possible to distinguish aerobic Gram-positive bacteria from aerobic Gram-negative bacteria. As examples of anaerobic bacteria, there may be mentioned:
   *Akkermansia muciniphila*
   *Faecalibacterium prausnitzii*
   *Clostridium scindens*
   *Bacteroides thetaiotaomicron*
   And those belonging to the Clostridiales.

According to an embodiment of the invention, analysing the relative fluorescences of the two fluorochromes makes it possible to distinguish Gram-positive and Gram-negative bacterial species because each species will have a fluorescence signature of its own. For example, the following species may be mentioned as species which can be distinguished from one another: *Salmonella enterica, Salmonella bongori, Bacillus subtilis, Bacillus cereus, Bacillus thuringiensis, Lactococcus lactis, Lactococcus plantarum, Escherichia coli, Staphylococcus aureus, Staphylococcus epidermidis, Enterococcus faecalis, Enterococcus hirae, Enterococcus durans, Enterococcus casseliflavus, Enterococcus gallinarum, Klebsiella pneumoniae, Lactobacillus crispatus, Lactobacillus reuteri, Lactobacillus gasseri* and *Lactobacillus brevis, Faecalibacterium prausnitzii, Akkermansia muciniphila, Clostridium spiroforme, Clostridium innocuum, Clostridium scindens, Flavonifractor plautii, Bacteroides thetaiotaomicron, Bacteroides fragilis, Blautia hansenii* and *Blautia schinkii* for example. This list is not exhaustive.

Figure 3A:
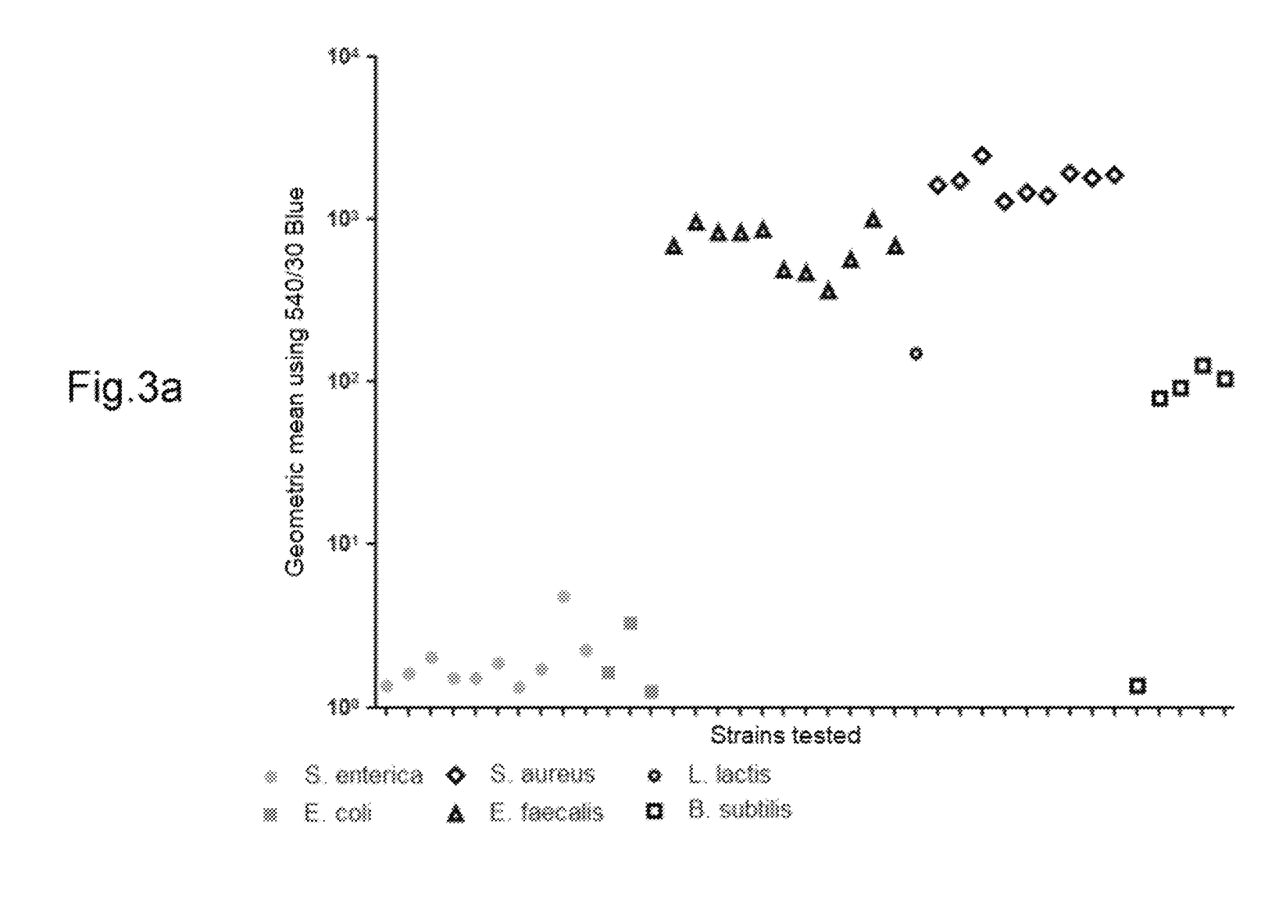
Figure 3B:
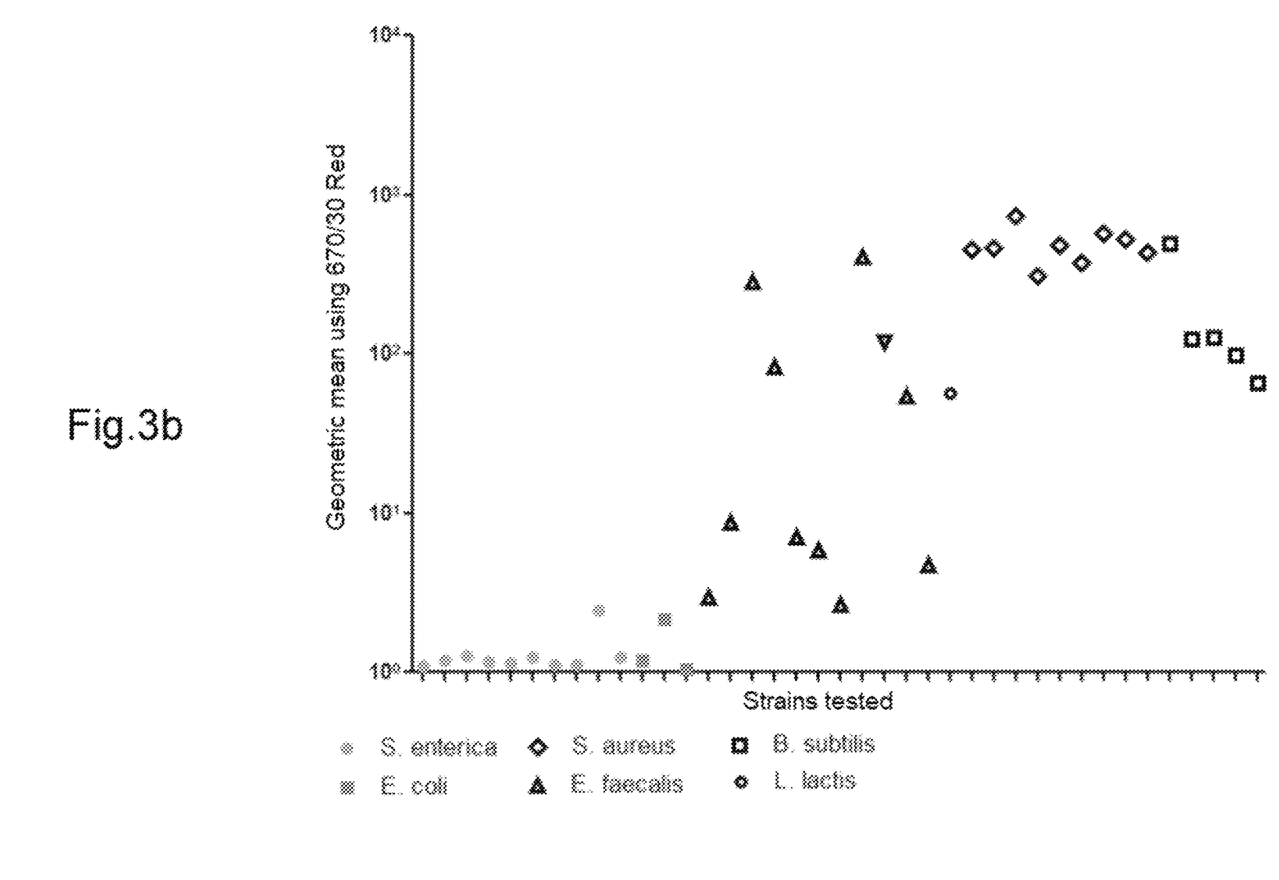

Example 3 shows how it is possible, by implementing the method according to an embodiment, to distinguish at least six different species by analysing the relative fluorescences of two labelling agents of vancomycin coupled to BODIPY® FL and WGA coupled to Alexa Fluor® 647. It is possible to identify species by comparing obtained signatures with reference signatures.

FIGS. 3A and 3B show the results of the experiment described in Example 3, where the relative fluorescence of the labelling agents—vancomycin coupled to BODIPY® FL and WGA coupled to Alexa Fluor® 647—is measured. The graph in FIG. 3A shows the geometric mean of the fluorescences obtained, for the different species tested, at a wavelength of 540 nm±15 nm, which corresponds to the fluorescence of vancomycin coupled to BODIPY® FL. It is noted that the members of the same species are found grouped together and the analysis makes it possible to distinguish different species: *Salmonella enterica, Bacillus subtilis, Escherichia coli, Staphylococcus aureus* and *Enterococcus faecalis*. Each species occupies a different area of the graph.

The graph in FIG. 3B shows the geometric mean of the fluorescences obtained, for the different species tested, at a wavelength of 670 nm±15 nm, which corresponds to the fluorescence of WGA coupled to Alexa Fluor® 647. It is noted that the members of the same species are grouped together, except the species *E. faecalis*, for which the members are more dispersed. Thus, analysis with the two labelling agents makes it possible to distinguish Gram-positive bacterial species, such as for example, *Bacillus subtilis, Staphylococcus aureus, Enterococcus faecalis* and *Lactobacillus* spp.

According to an embodiment of the invention, analysing the relative fluorescences of the two fluorochromes makes it possible to determine the ratio of Gram-positive bacteria to Gram-negative bacteria in in vitro microbiota cultures.

Backgating can be carried out on the populations highlighted in the analysis of the relative fluorescences of the two selected fluorochromes. "Backgating" is a technique used in flow cytometry, known to a person skilled in the art, which makes it possible to confirm a labelling signature (and the "gating" method used). According to an embodiment of the invention, from the populations identified on the graphs showing the intensity of the fluorescence at a wavelength of, for example, 540 nm±15 nm, which corresponds to the fluorescence of the vancomycin coupled to BODIPY® FL, and the intensity of the fluorescence at a wavelength of, for example, 670 nm±15 nm, which corresponds to the fluorescence of the WGA coupled to Alexa Fluor® 647, the backgating would comprise selecting one of the populations and returning to the FSC/SSC profile thereof. The method claimed thus makes it possible to potentially identify certain populations. It makes it possible to highlight different populations at the level of families, genera and/or species present in the culture and estimate their diversity, as well as the percentage of Gram-negative bacteria and of Gram-positive bacteria.

According to an embodiment of the invention, the method claimed could be used to correlate the results of the Gram labelling in cytometry to those of the 16S analysis.

The effectiveness of this analysis is very useful for analysing complex samples such as microbiota samples. The invention thus makes it possible to characterize complex samples which can have a medical use, or a use as a research tool, in particular in metagenomics. Thus, the importance of reliability, reproducibility, accuracy and sensitivity of the analysis is paramount.

The invention is also described with reference to the following examples. It will be appreciated that the invention as claimed is not intended to be limited in any way at all by these examples.

EXAMPLES

Example 1

The different species tested were cultivated overnight at 37±1° C. or 30±1° C. with or without stirring at 180 rpm in Luria Bertani (LB) or Brain Heart Infusion (BHI) medium according to the requirements of the different strains. The different bacterial suspensions were adjusted to around $10^6$ CFU/mL. The labelling agents were prepared upstream by combining the vancomycin coupled to BODIPY® FL, the vancomycin and the WGA coupled to Alexa Fluor® 647 at concentrations of 0.5 µg/mL, 0.5 µg/mL and 100 µg/mL respectively. The labelling agent was brought into contact with the different species to be tested. After 15 minutes of incubation in darkness at ambient temperature, washing was carried out with a PBS solution followed by a centrifugation step at 3,220 g for 15 minutes. The samples were then analysed with the Influx cytometer (BD).

The Influx cytometer (BD), fitted with a 488 nm laser (power of 200 mW), 405 nm laser (power of 100 mW) and 640 nm laser (power of 120 mW), was used for the cytometry analyses. The size (Forward: FSC) and granularity (Side: SCC) signals are obtained at 488 nm. The 488 nm wavelength laser is used to excite the vancomycin and its fluorescence is collected through the 540/30 nm passband. The WGA is excited with the 640 nm laser and its fluorescence is collected though the 670/30 nm passband. Before any samples pass through, calibration spheres are used to carry out quality control of the cytometer calibration. The sample throughput was maintained between 500 events per second and 5,000 events per second. Recordings of 50,000 events were carried out.

The analyses were carried out with FlowJo software. Background noise was eliminated for the analyses of the Gram labellings and the targeting of the Gram populations was carried out manually around visible population groups.
Results FIG. 1 shows the results of the experiment described in Example 1 in which samples of two Gram-negative species (*Klebsiella pneumoniae* ATCC 700603 and *Salmonella enterica* ATCC 13311) and two Gram-positive species (*Enterococcus faecalis* JH2.2 and *Lactococcus lactis* MG1363) are analysed according to an embodiment of the invention.

In the graphs, the X axis shows the intensity of the fluorescence at a wavelength of 540 nm±15 nm, which corresponds to the fluorescence of the vancomycin coupled to BODIPY® FL and the Y axis shows the intensity of the fluorescence at a wavelength of 670 nm±15 nm, which corresponds to the fluorescence of the WGA coupled to Alexa Fluor® 647.

It is noted that the Gram-negative species are not labelled and that the Gram-positive species are well labelled.

Example 2

The different species tested were cultivated overnight at 37±1° C. or 30±1° C. with or without stirring at 180 rpm in Luria Bertani (LB) or Brain Heart Infusion (BHI) medium according to the requirements of the different strains. The different bacterial suspensions were adjusted to around $10^6$ CFU/mL either in PBS (for the PBS condition) or in 1M KCl (for the KCl condition). Certain bacterial suspensions were treated with 1% paraformaldehyde (PFA) for 1 h at ambient temperature, followed by two centrifugations at 3,220 g for 15 minutes to remove any PFA residues. The bacterial species were suspended in either PBS or 1M KCl according to the condition tested and the labelling agents, prepared previously, combining vancomycin coupled to BODIPY® FL, vancomycin and WGA coupled to Alexa Fluor® 647 at concentrations of 2 µg/mL, 2 µg/mL and 20 µg/mL respectively were brought into contact with the bacterial suspensions. After 15 minutes of incubation of the labelling agents in darkness at ambient temperature and washing with a PBS solution and then centrifugation at 3,220 g for 15 minutes, the samples were analysed with the Influx cytometer (BD).
Results FIG. 2 shows the results of the experiment described in Example 2 in which samples of three Gram-negative species (*Klebsiella pneumoniae* ATCC 700603, *Salmonella enterica* ATCC 13311 and *E. coli* ATCC 35218) and three Gram-positive species (*Enterococcus faecalis* JH2.2 and *Lactococcus lactis* MG1363 and *Bacillus subtilis* ATCC 23857) are analysed according to an embodiment of the invention. The bacteria were labelled with WGA coupled to Alexa Fluor® 647 and vancomycin coupled to BODIPY® FL in the presence of 1M KCl. It is noted that the Gram-negative species are not labelled and that the three Gram-positive species are well labelled.

Example 3

The different species tested were cultivated overnight at 37±1° C. or 30±1° C. with or without stirring at 180 rpm in Luria Bertani (LB) or Brain Heart Infusion (BHI) medium according to the requirements of the different strains. The different bacterial suspensions were adjusted to around $10^F6$ CFU/mL. The labelling agents were prepared upstream by combining the vancomycin coupled to BODIPY® FL, the vancomycin and the WGA coupled to Alexa Fluor® 647 at concentrations of 2 µg/mL, 2 µg/mL and 20 µg/mL respectively in a solution containing 1M KCl final. The labelling agent was brought into contact with the different species to be tested. After 15 minutes of incubation in darkness at ambient temperature, washing was carried out with a PBS solution followed by a centrifugation step at 15,000 g for 5 minutes. The samples were then analysed with the Influx cytometer (BD).

The invention claimed is:

1. A method for detecting, in a sample containing bacteria, the proportion of Gram-positive bacteria relative to the proportion of Gram-negative bacteria, comprising the steps of:
   a) incubating the sample, simultaneously or sequentially, with:
      wheat lectin (WGA) coupled to a first fluorochrome,
      vancomycin coupled to a second fluorochrome emitting a fluorescence at a different wavelength from the first fluorochrome coupled to WGA,
      optionally vancomycin that is not coupled to a fluorochrome,
      optionally potassium chloride,
   b) centrifuging the sample resulting from step a),
   c) optionally washing the sample resulting from step b), and
   d) measuring the fluorescence of the first and second fluorochromes of the sample resulting from step b) or c) using flow cytometry at different wavelengths to determine the proportion of Gram-positive bacteria relative to the proportion of Gram-negative bacteria in the sample.

2. The method according to claim 1, wherein the first fluorochrome coupled to WGA is Alexa Fluor® 647 and the second fluorochrome coupled to vancomycin is 3-BODIPY-propanoic acid.

3. The method according to claim 1, wherein the measurement step is carried out in less than 40 minutes after the end of step c).

4. The method according to claim 1, wherein, in step a), the concentration of the wheat lectin (WGA) coupled to the first fluorochrome in the sample to be analyzed is from 5 to 100 µg/ml, and/or the final concentration of the vancomycin coupled to the second fluorochrome in the sample to be analyzed is from 0.15 to 4 µg/ml.

5. The method according to claim 1, wherein the incubation time in step a) is from 10 to 30 minutes.

6. The method according to claim 1, wherein the sample is a sample of human or animal microbiota.

7. A method for detecting, optionally distinguishing and identifying families, genera and/or species of Gram-positive bacteria and Gram-negative bacteria in a bacterial sample, comprising the steps of:
   a) incubating the sample, simultaneously or sequentially, with:
      wheat lectin (WGA) coupled to a first fluorochrome,
      vancomycin coupled to a second fluorochrome emitting a fluorescence at a different wavelength from the first fluorochrome coupled to WGA,
      optionally vancomycin,
      optionally potassium chloride,
   b) centrifuging the sample,
   c) optionally washing the sample,
   d) measuring the fluorescence of the sample using flow cytometry,
   e) analyzing the relative fluorescences of the first and second fluorochromes, and
   f) optionally distinguishing and identifying families, genera and/or species of Gram-positive and Gram-negative bacteria by comparing the relative fluorescences of the first and second fluorochromes at different wavelengths.

8. The method according to claim 7, wherein the first fluorochrome coupled to WGA is Alexa Fluor® 647 and the second fluorochrome coupled to vancomycin is 3-BODIPY-propanoic acid.

9. A kit for detecting the proportion of Gram-positive bacteria and the proportion of Gram-negative bacteria in a bacterial sample by flow cytometry, comprising:
   i. wheat lectin (WGA) coupled to a first fluorochrome,
   ii. vancomycin coupled to a second fluorochrome emitting a fluorescence at a different wavelength from the first fluorochrome coupled to WGA, and
   iii. optionally vancomycin,
   iv. optionally potassium chloride.

10. The kit according to claim 9, wherein the first and second fluorochromes are selected from Alexa Fluor® labelling agent, 3-BODIPY-propanoic acid or one of its derivatives, fluorescein or one of its derivatives, salts or esters, a Cy labelling agent, a CF labelling agent, or a conjugated fluorochrome.

11. The kit according to claim 10, wherein the first fluorochrome coupled to WGA is an Alexa Fluor® labelling agent, fluorescein or one of its derivatives, salts or esters.

12. The kit according to claim 10, wherein the second fluorochrome coupled to vancomycin is 3-BODIPY-propanoic acid or one of its derivatives, fluorescein or one of its derivatives, salts or esters.

13. The kit according to claim 10, wherein the first fluorochrome coupled to WGA is Alexa Fluor® 647 and the second fluorochrome coupled to vancomycin is 3-BODIPY-propanoic acid.

14. The method according to claim 1, wherein the measurement step is carried out in less than 30 minutes.

15. The method according to claim 1, wherein, in step a), the concentration of the wheat lectin (WGA) coupled to the first fluorochrome in the sample to be analyzed is 20 µg/ml, and/or the final concentration of the vancomycin coupled to the second fluorochrome in the sample to be analyzed is 2 µg/ml.

16. The method according to claim 1, wherein the incubation time in step a) is 15 minutes.

17. The kit according to claim 10, wherein the second fluorochrome coupled to vancomycin is FITC.

* * * * *